US012623611B2

(12) United States Patent
Kuwano et al.

(10) Patent No.: US 12,623,611 B2
(45) Date of Patent: May 12, 2026

(54) AUXILIARY STORAGE BOX

(71) Applicant: SUBARU CORPORATION, Tokyo (JP)

(72) Inventors: Tomoaki Kuwano, Tokyo (JP); Yusuke Yazaki, Tokyo (JP); Sakura Tsuji, Tokyo (JP); Ryunosuke Akechi, Tokyo (JP); Tomoya Yokoi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 399 days.

(21) Appl. No.: 18/372,761

(22) Filed: Sep. 26, 2023

(65) Prior Publication Data

US 2024/0116453 A1    Apr. 11, 2024

(30) Foreign Application Priority Data

Oct. 7, 2022    (JP) ................................. 2022-162799

(51) Int. Cl.
| | |
|---|---|
| B60R 11/00 | (2006.01) |
| B65D 51/28 | (2006.01) |
| B65D 77/04 | (2006.01) |
| B65D 83/08 | (2006.01) |

(52) U.S. Cl.
CPC .............. B60R 11/00 (2013.01); B65D 51/28 (2013.01); B65D 77/0453 (2013.01); B65D 83/0805 (2013.01); B60R 2011/0007 (2013.01)

(58) Field of Classification Search
CPC . B60R 11/00; B60R 2011/0007; B65D 51/28; B65D 77/0453; B65D 83/0805
See application file for complete search history.

(56) References Cited

U.S. PATENT DOCUMENTS

| | | | | | |
|---|---|---|---|---|---|
| 2,988,206 | A | * | 6/1961 | Olson | B60N 3/08 |
| | | | | | 229/122 |
| 4,848,627 | A | * | 7/1989 | Maeda | E05B 83/32 |
| | | | | | 248/311.2 |
| 6,719,343 | B2 | * | 4/2004 | Emerling | B60R 11/00 |
| | | | | | 224/555 |
| 6,761,388 | B2 | * | 7/2004 | Lein | B60N 3/102 |
| | | | | | 296/37.8 |

(Continued)

FOREIGN PATENT DOCUMENTS

JP          7-266993  A      10/1995

*Primary Examiner* — Jonathan Malikasim
(74) *Attorney, Agent, or Firm* — TROUTMAN PEPPER LOCKE LLP

(57) ABSTRACT

An auxiliary storage box is stored inside a storage box including a box body and a lid body and is detachable from the storage box. The auxiliary storage box includes: an auxiliary box body; an auxiliary lid body; and a lid receiving portion. The auxiliary box body is detachable and stored inside the box body. The auxiliary lid body is detachably held on a back surface side of the lid body in such a manner that a first surface faces the auxiliary box body. The auxiliary lid body closes an opening of the auxiliary box body when the lid body closes the box body. The lid receiving portion is disposed in the opening in an upper portion of the auxiliary box body. The first surface of the auxiliary lid body elastically contacts the lid receiving portion to seal the opening when the auxiliary lid body closes the opening.

13 Claims, 8 Drawing Sheets

(56) References Cited

U.S. PATENT DOCUMENTS

| | | | | |
|---|---|---|---|---|
| 7,322,500 B2 * | 1/2008 | Maierholzner | ........ | B60N 3/102 |
| | | | | 224/544 |
| 8,556,320 B2 * | 10/2013 | Yamagishi | ................ | B60R 7/04 |
| | | | | 296/37.8 |
| 9,414,893 B2 * | 8/2016 | Jacobson | ................ | A61B 50/33 |
| 10,906,469 B2 * | 2/2021 | Smolik | .................. | B60N 2/793 |
| 11,358,531 B2 * | 6/2022 | Heinz | ................. | E05B 47/0002 |
| 11,970,332 B1 * | 4/2024 | Peng | .................... | B65F 1/0053 |
| 12,479,368 B2 * | 11/2025 | Iso | ............................ | B60R 7/06 |
| 2002/0121449 A1 * | 9/2002 | Bowie | ....................... | A61L 2/26 |
| | | | | 206/362 |
| 2008/0110950 A1 * | 5/2008 | Dowd | ..................... | B60R 13/02 |
| | | | | 224/547 |
| 2008/0257923 A1 * | 10/2008 | DalPizzol | ................. | B60R 7/04 |
| | | | | 224/400 |
| 2009/0223992 A1 * | 9/2009 | Lorenzati | ............ | A47K 10/421 |
| | | | | 221/34 |
| 2010/0154684 A1 * | 6/2010 | Mayne | ....................... | B60R 7/04 |
| | | | | 108/44 |
| 2023/0391239 A1 * | 12/2023 | Hudson | .................. | B60K 35/10 |
| 2024/0116448 A1 * | 4/2024 | Kuwano | ................... | B60R 7/04 |

* cited by examiner

AUXILIARY STORAGE BOX

CROSS-REFERENCE TO RELATED APPLICATION

The present application claims priority from Japanese Patent Application No. 2022-162799 filed on Oct. 7, 2022, the entire contents of which are hereby incorporated by reference.

BACKGROUND

The disclosure relates to an auxiliary storage box of a storage box provided in a vehicle interior of a vehicle.

Conventionally, a storage box for storing an article is provided in a vehicle interior of a vehicle. In recent years, such a storage box is intended to cope with storage of various articles in order to improve convenience for a user.

For example, as is well known, in a center console, a dashboard, or the like, a large-capacity storage box such as a console box or a glove box is provided by using a wide space inside.

In order to further improve the convenience of such a large-capacity storage box, various techniques have been conventionally proposed. For example, Japanese Unexamined Patent Application Publication No. H07-266993 discloses a storage box (auxiliary storage box) that is detachably attached to the inside of a console box. The auxiliary storage box can be installed and used at an appropriate place in the vehicle. Further, the auxiliary storage box is provided with a pivoting lid having a holder hole in an opening on an upper surface. The pivoting lid having a holder hole is used as a lid for a garbage container or a lid for a small article container. Furthermore, a container containing a can, a bin, and food can be inserted into and held in the holder hole.

SUMMARY

An aspect of the disclosure provides an auxiliary storage box that is stored inside a storage box including a box body and a lid body and is detachable from the storage box. The auxiliary storage box includes an auxiliary box body, an auxiliary lid body, and a lid receiving portion. The auxiliary box body is detachable and stored inside the box body. The auxiliary lid body is detachably held on a back surface side of the lid body in such a manner that a first surface faces the auxiliary box body. The auxiliary lid body is configured to close an opening of the auxiliary box body when the lid body closes the box body. The lid receiving portion is disposed in the opening in an upper portion of the auxiliary box body. The first surface of the auxiliary lid body is configured to, when the auxiliary lid body closes the opening, elastically contact the lid receiving portion to seal the opening.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

DETAILED DESCRIPTION

Figure 1:
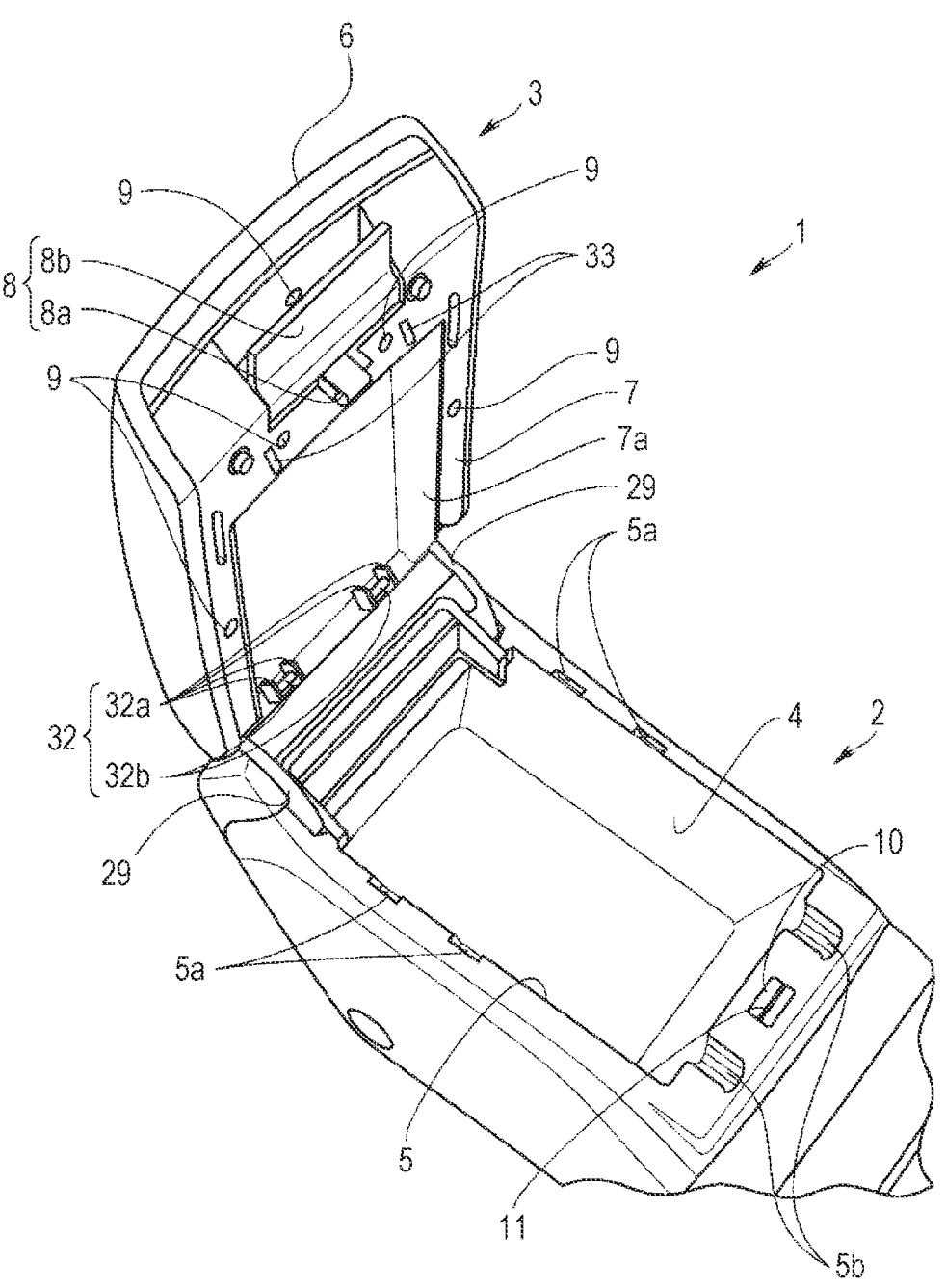
FIG. 1 is a perspective view of a console box.

When the auxiliary storage box as described above is used as a trash box, it is desirable to further improve functionality based on a sanitary viewpoint or the like.

It is desirable to provide an auxiliary storage box that can achieve high functionality even when used as a trash box.

Hereinafter, an embodiment of the present disclosure will be described with reference to the drawings.

Note that, in the drawings used in the following description, scales are different for each component in order to make each component recognizable in the drawings. Therefore, the disclosure is not limited only to the illustrated form with respect to the quantities of components, the shapes of components, the ratios of the sizes of components, the relative positional relationship of components, and the like described in these drawings.

A configuration of a console box will be described as an example of a storage box to which the auxiliary storage box in the present embodiment is applied. The console box of the present embodiment is provided in a center console (not illustrated). Note that the center console is provided between a driver's seat and a passenger's seat in a vehicle interior of the vehicle.

As illustrated in FIG. 1, a console box 1 includes a box body 2 and a lid body 3.

A box inner 4 is provided inside the box body 2. The box inner 4 is constituted by a hollow member having a substantially rectangular parallelepiped shape. An opening 5 that opens an internal space of the box inner 4 upward is provided in an upper portion of the box inner 4. Here, a pair of first positioning recesses 5a is provided at left and right side edges of the opening 5. These first positioning recesses 5a are constituted by, for example, recesses each having a rectangular shape in plan view and are provided at left and right side edges of the box body 2. A pair of second positioning recesses 5b is provided at a front edge of the opening 5. These second positioning recesses 5b are constituted by, for example, U-shaped grooves each extending from the front edge of the box body 2.

The lid body 3 is provided at a position where the opening 5 can be opened and closed in the upper portion of the box body 2.

The lid body 3 includes a lid body outer 6, a lid body inner 7, and a lock part 8.

The lid body outer 6 is constituted by, for example, a resin member having elasticity. Thus, the lid body 3 may also serve as an "arm rest" on which the arm of the occupant can be placed.

The lid body outer 6 is permanently fixed to the lid body inner 7 by a screw 9 or the like.

The lid body inner 7 has a recess 7*a* having a rectangular shape in plan view. An outer dimension of the recess 7*a* in plan view is set to be slightly larger than an outer dimension of a bottom surface of a box tissue, for example.

Note that each surface of the box tissue is defined as follows for convenience.

That is, a surface of the box tissue provided with a tissue takeout slot is defined as an upper surface, and a surface facing the upper surface is defined as the bottom surface.

Furthermore, the lid body inner 7 further includes support parts 32 and slits 33.

The support parts 32 are provided in a pair on a wall portion forming the recess 7*a* at a rear of the lid body inner 7. Each support part 32 has a pair of projecting parts 32*a* and a shaft 32*b* supported between the pair of projecting parts 32*a*. These support parts 32 can swingably support an auxiliary lid body 15 described later.

The slits 33 are provided in pairs on the surface of the lid body inner 7 facing the box body 2 in front of the recess 7*a* and at positions facing the opening 5. Each of the slits 33 has a hole shape for inserting and fixing a projection. These slits 33 are capable of detachably fixing the auxiliary lid body 15 described later to the lid body inner 7.

Furthermore, the lid body inner 7 is supported by the box body 2 via a hinge (not illustrated) provided at a rear end. Thus, the lid body 3 is swingable with the rear end of the box body 2 as a fulcrum. Due to such swinging, the lid body 3 can be displaced between a closing position where the lid body 3 closes the opening 5 of the box body 2 and an opening position where the lid body 3 opens the opening 5 of the box body 2. Note that the opening position of the lid body 3 with respect to the box body 2 is defined by the arm stopper 29.

The lock part 8 is provided at the front end of the lid body inner 7. The lock part 8 integrally includes a hook 8*a* and a lever 8*b*.

The hook 8*a* is inserted into a hole 10 provided in the box body 2 when the lid body 3 closes the opening 5. Then, the hook 8*a* inserted into the hole 10 of the box body 2 is locked to a locking part 11. Note that the hook 8*a* is biased toward the locking part 11 by a biasing force of a spring (not illustrated) or the like provided inside the lock part 8.

The lever 8*b* is pulled up when the opening 5 is opened by the lid body 3. Thus, the lever 8*b* has a structure for releasing the locking of the hook 8*a* with respect to the locking part 11.

An auxiliary storage box 13 for storing articles and the like is stored inside the console box 1 configured as described above (see FIGS. 2 and 3).

Figure 2:
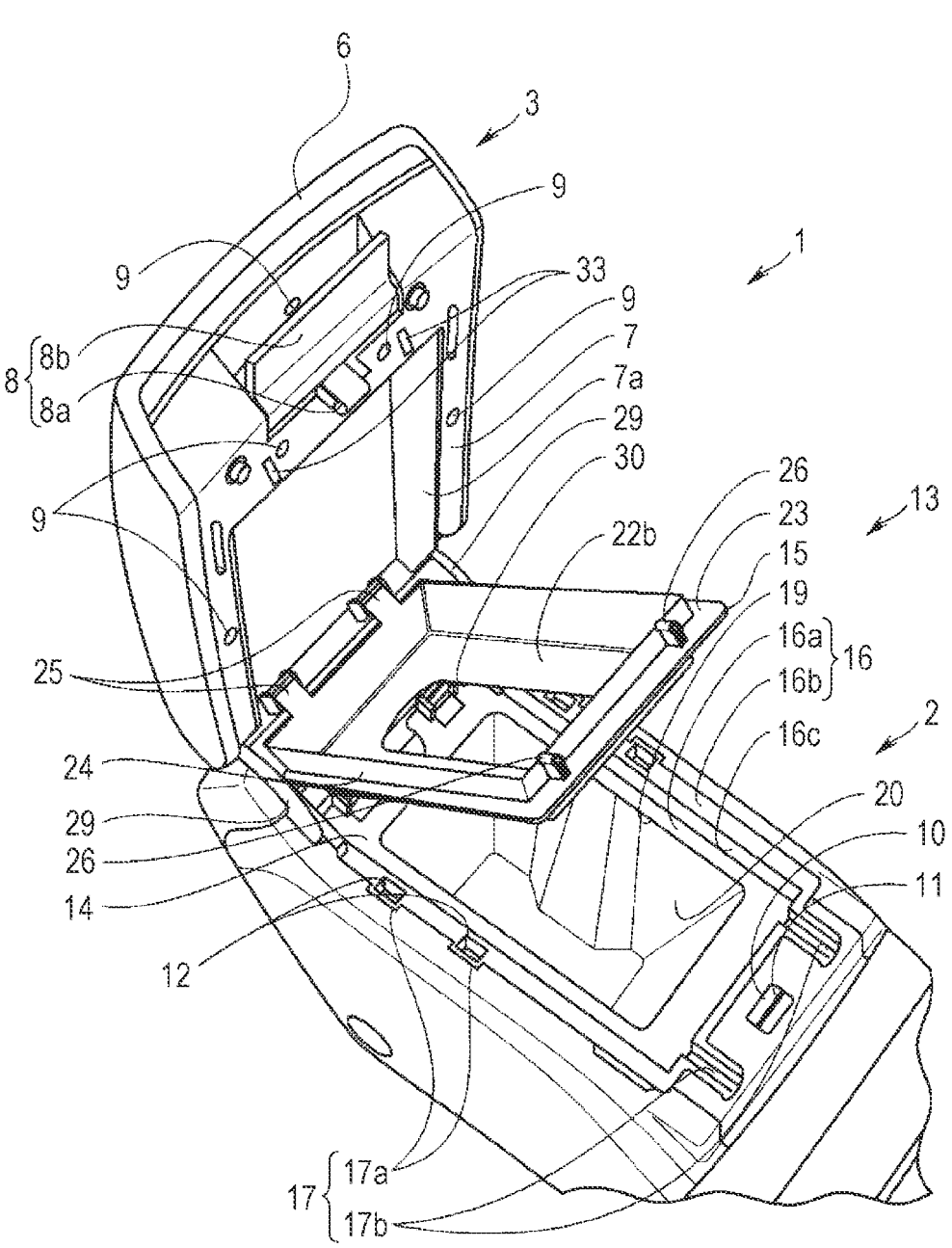
FIG. 2 is a perspective view of the console box in a state where an auxiliary storage box is stored and an auxiliary lid body is opened with respect to a lid body.
Figure 3:
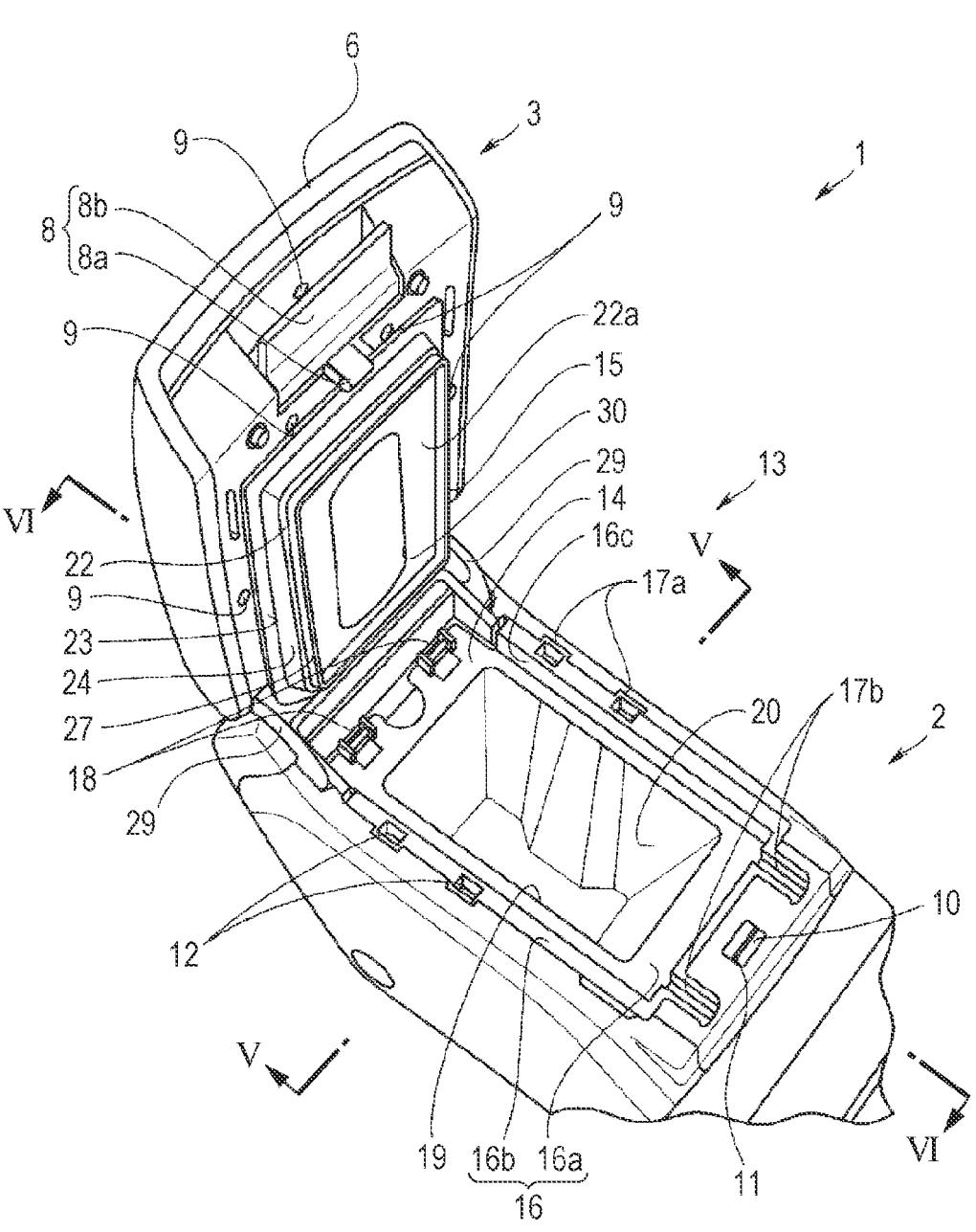
FIG. 3 is a perspective view of the console box in a state where the auxiliary storage box is stored and the auxiliary lid body is closed with respect to the lid body.
Figure 7:
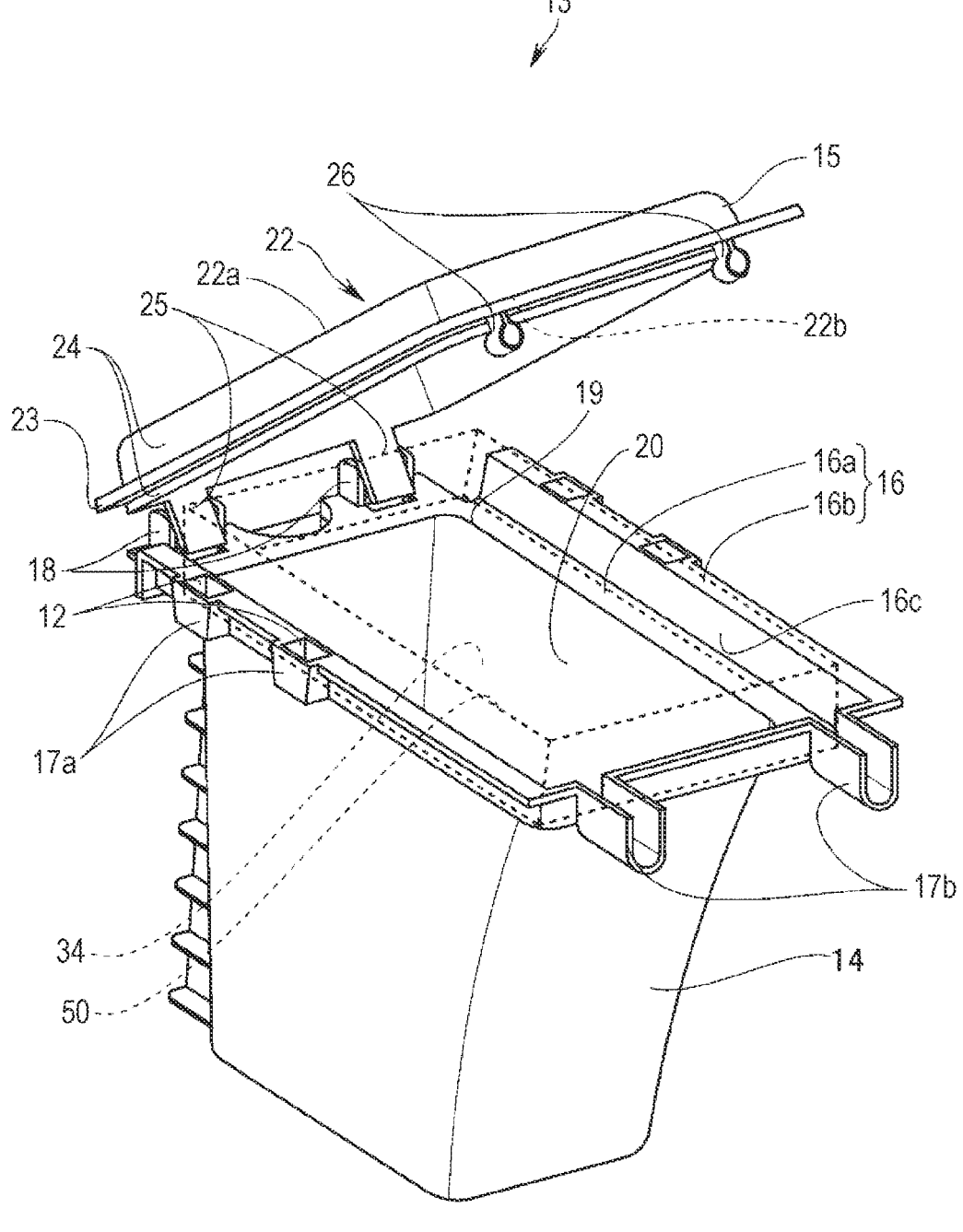
FIG. 7 is a perspective view of the auxiliary storage box in a state where the auxiliary lid body is opened with respect to the auxiliary box body in a state where the auxiliary lid body is attached to the auxiliary box body.

The auxiliary storage box 13 can be detachably held with respect to the console box 1. As illustrated in FIGS. 2, 3, and 7, the auxiliary storage box 13 includes an auxiliary box body 14 and the auxiliary lid body 15.

The auxiliary box body 14 has a hollow and vertically long substantially rectangular parallelepiped shape that can be accommodated in the box body 2 (box inner 4).

An opening 19 that opens an internal space is formed in an upper portion of the auxiliary box body 14. Further, at a lower end of the auxiliary box body 14, a flat surface for allowing the auxiliary box body 14 to stand by itself is formed.

Figure 4:
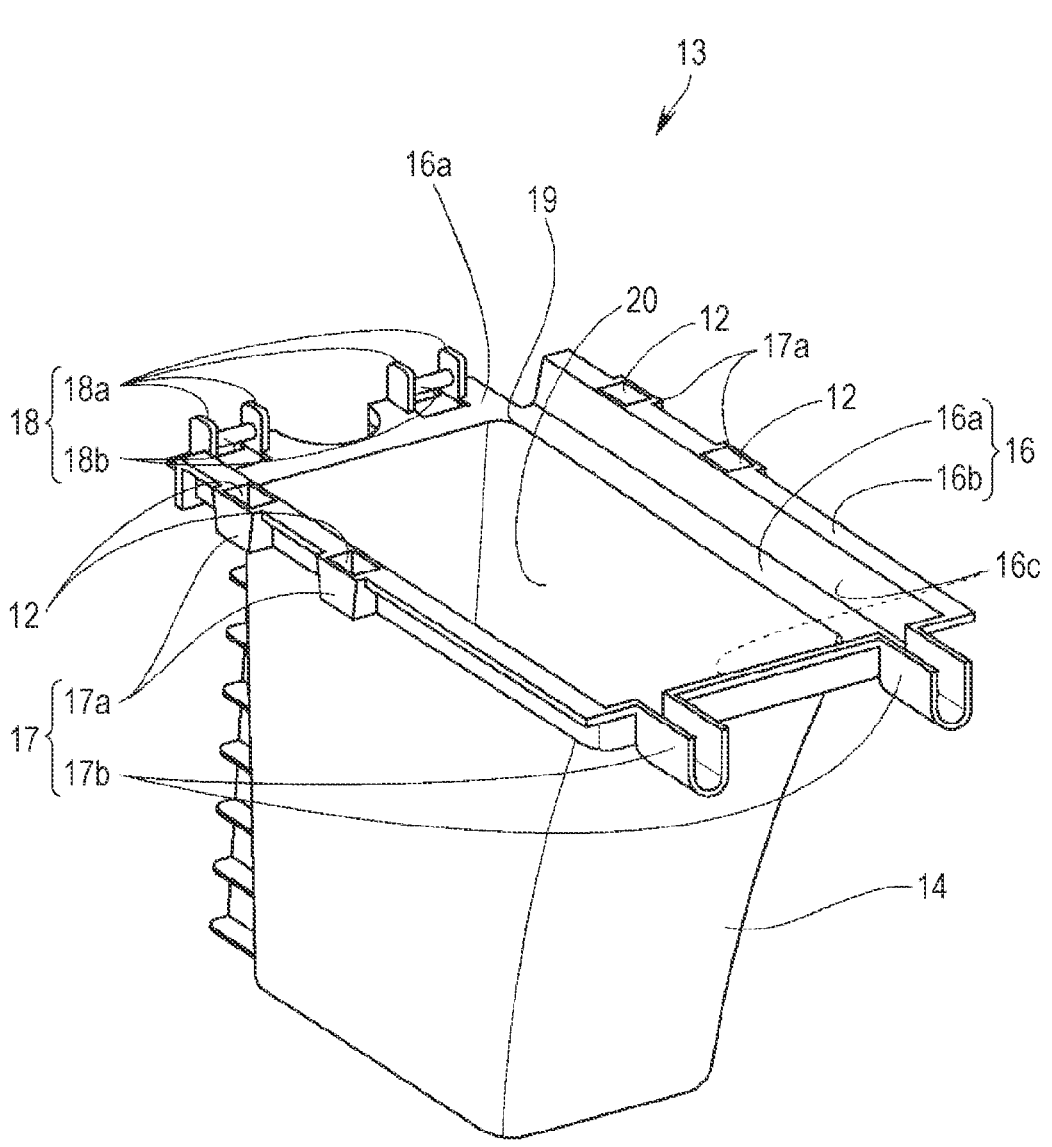
FIG. 4 is a perspective view of an auxiliary box body as viewed from diagonally front right.

Furthermore, as illustrated in FIG. 4, the auxiliary box body 14 further has an outward flange 16, fixing portions 17, and support parts 18.

The outward flange 16 has a first outward flange 16*a* and a second outward flange 16*b*. The first outward flange 16*a* is provided on an outer periphery of the opening 19 formed in the upper portion of the auxiliary box body 14. The first outward flange 16*a* is formed outward with respect to a side wall 20 of the auxiliary box body 14.

The second outward flange 16*b* is coupled to the first outward flange 16*a* in a stepwise manner via a wall portion 16*c*. That is, the wall portion 16*c* extending upward is formed at a front edge and left and right side edges of the first outward flange 16*a*. At an upper end of the wall portion 16*c*, the second outward flange 16*b* is formed outward with respect to the wall portion 16*c*.

Note that surfaces (upper surfaces) of the first outward flange 16*a* and the second outward flange 16*b* constituting the outward flange 16 have a planar shape. Thus, the outward flange 16 may serve as a "lid receiving portion" that abuts on the auxiliary lid body 15 described later.

The fixing portion 17 has first fixing portions 17*a* and second fixing portions 17*b*.

The first fixing portions 17*a* are constituted by a pair of projections on the left and right sides of the auxiliary box body 14. These first fixing portions 17*a* are integrally formed with the outward flange 16 at positions corresponding to the respective first positioning recesses 5*a*. A pair of holes 12 is formed on an upper surface of each of the first fixing portions 17*a*.

The second fixing portions 17*b* are constituted by a pair of projections provided at the front end of the opening 19. These second fixing portions 17*b* are constituted by, for example, U-shaped grooves each extending from the front end of the opening 19 at positions corresponding to the second positioning recesses 5*b*, respectively.

When the auxiliary box body 14 is stored in the box body 2, the fixing portions 17 configured as described above are fitted to the respective first and second positioning recesses 5*a* and 5*b* of the box body 2. That is, each of the first fixing portions 17*a* is fitted into the corresponding first positioning recess 5*a*. Further, each of the second fixing portions 17*b* is fitted into the corresponding second positioning recess 5*b*. Due to such fitting, the auxiliary box body 14 is positioned in a predetermined manner with respect to the box body 2.

As illustrated in FIG. 4, the support parts 18 are provided in a pair on the first outward flange 16*a* at the rear of the auxiliary box body 14. A distance between the pair of support parts 18 is set to be equal to a distance between the pair of support parts 32 provided on the lid body inner 7. Each support part 18 has a pair of projecting parts 18*a* provided on a first outward flange 16*a* and a shaft 18*b* supported between the pair of projecting parts 18*a*. These support parts 18 can swingably support the auxiliary lid body 15 described later.

The auxiliary lid body 15 can be detachably attached to the lid body 3 (see FIGS. 2 and 3). The auxiliary lid body 15 attached to the lid body 3 swings integrally with the lid body 3 to open and close the opening 19 of the auxiliary box body 14.

Figure 8:
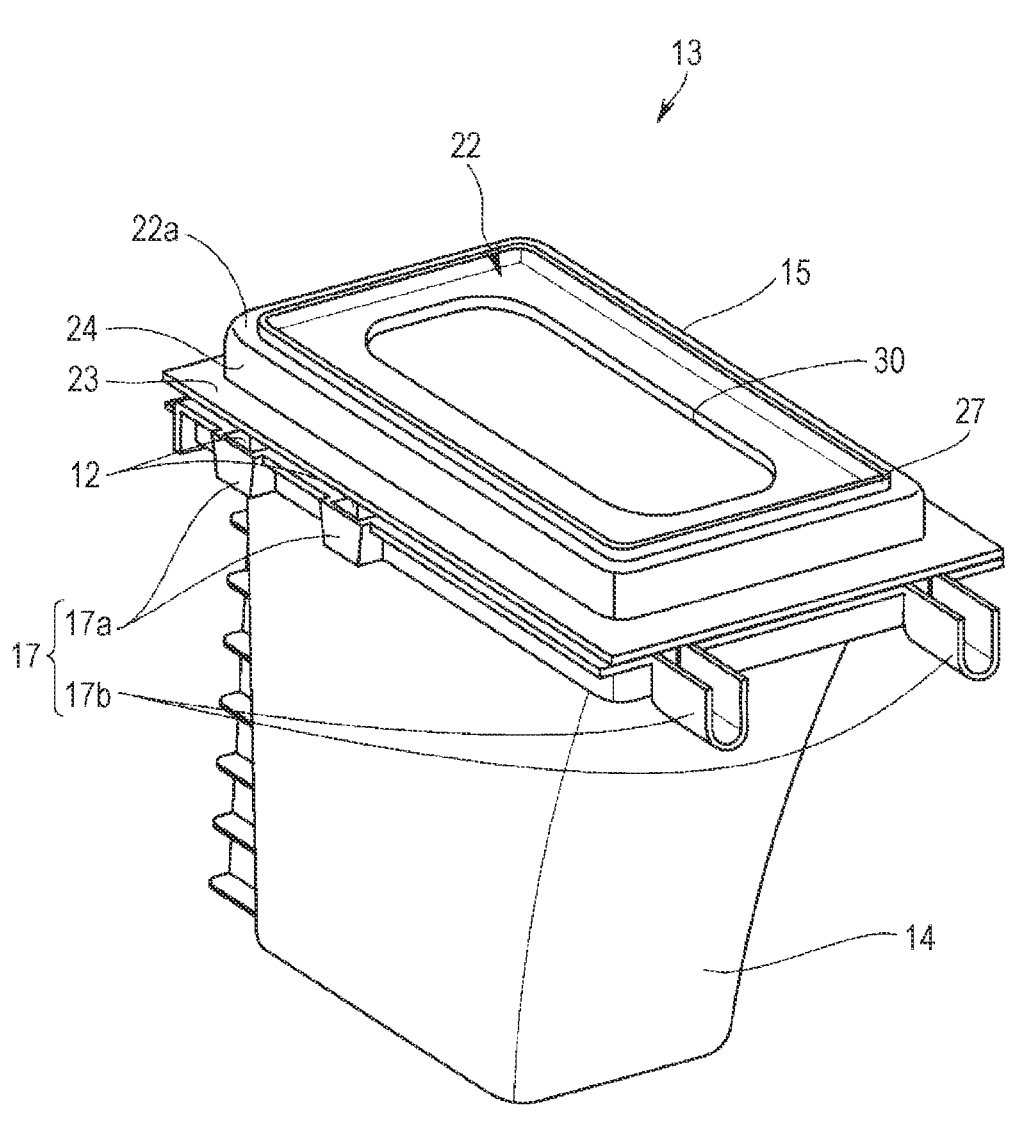
FIG. 8 is a perspective view of the auxiliary storage box in a state where the auxiliary lid body is closed with respect to the auxiliary box body in a state where the auxiliary lid body is attached to the auxiliary box body.

Further, the auxiliary lid body 15 can also be detachably attached to the auxiliary box body 14 (see FIGS. 7 and 8). The auxiliary lid body 15 can open and close the opening 19 of the auxiliary box body 14 by swinging with respect to the auxiliary box body 14.

The auxiliary lid body 15 includes a flat plate portion 22, a side wall portion 24, and an outward flange 23.

The flat plate portion 22 has, for example, a substantially rectangular shape in plan view capable of abutting on the first outward flange 16*a* of the auxiliary box body 14 to close the opening 19. An outer dimension of the flat plate portion 22 in plan view is substantially equal to or larger than an outer dimension of the opening 19. Further, the outer dimension of the flat plate portion 22 in plan view is smaller than an outer dimension of the first outward flange 16a. Furthermore, the outer dimension of the flat plate portion 22 in plan view is substantially equal to an outer dimension of the bottom surface of the box tissue.

Further, the flat plate portion 22 has a hole 30. The hole 30 is formed in a substantially central portion of the flat plate portion 22 to have a rounded rectangular shape. The hole 30 is provided, for example, as an outlet for tissue or the like.

Furthermore, a seal member 27 is provided on a first surface 22a which is one surface of the flat plate portion 22.

The seal member 27 is annularly provided along an outer periphery of the first surface 22a. The seal member 27 is formed by, for example, an elastic member such as a rubber material. The seal member 27 is bonded to the first surface 22a by an adhesive part such as a double-sided tape.

Figure 5:
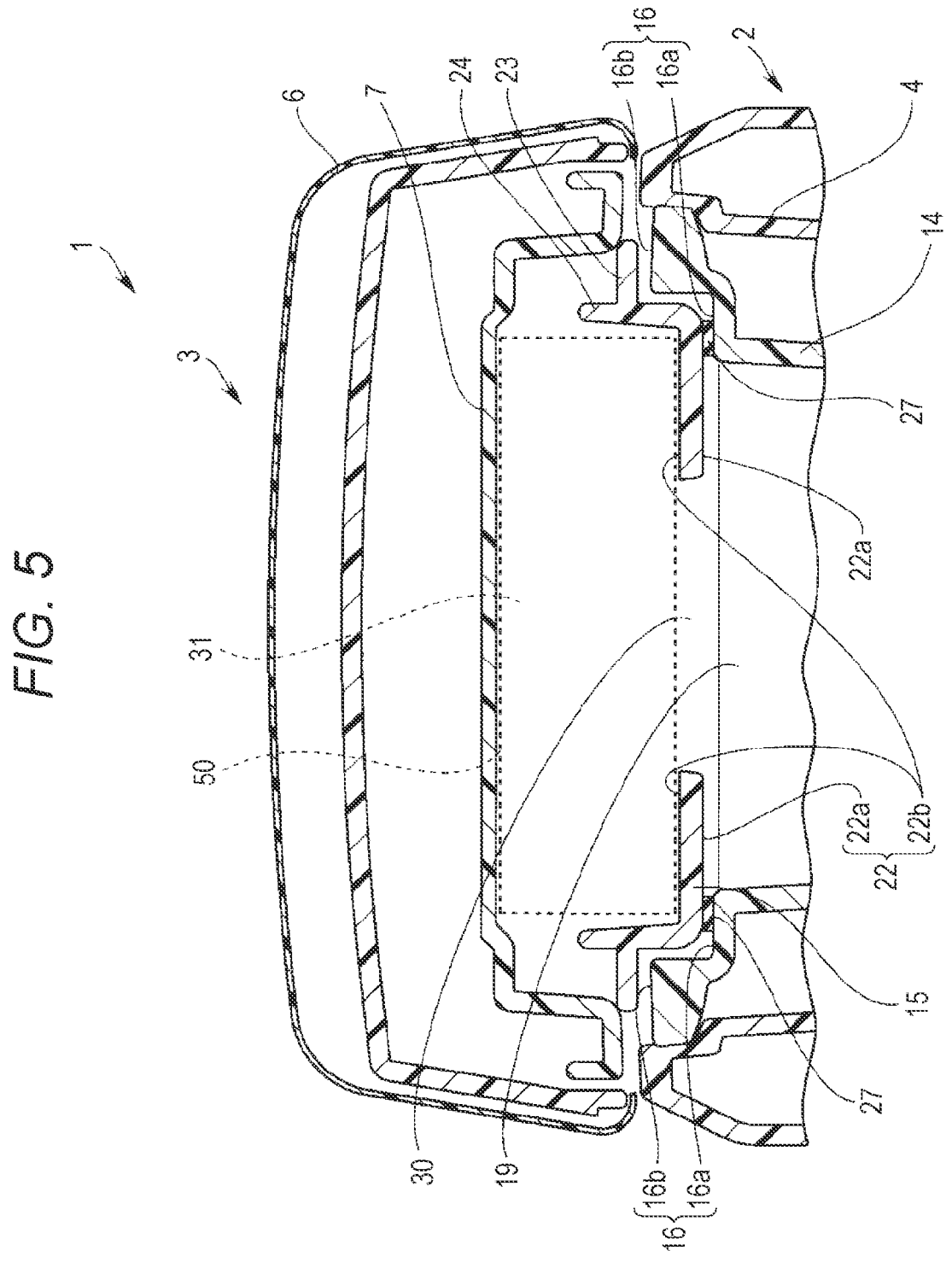
FIG. 5 is a cross-sectional view taken along line V-V in a state where the lid body of FIG. 3 is closed.
Figure 6:
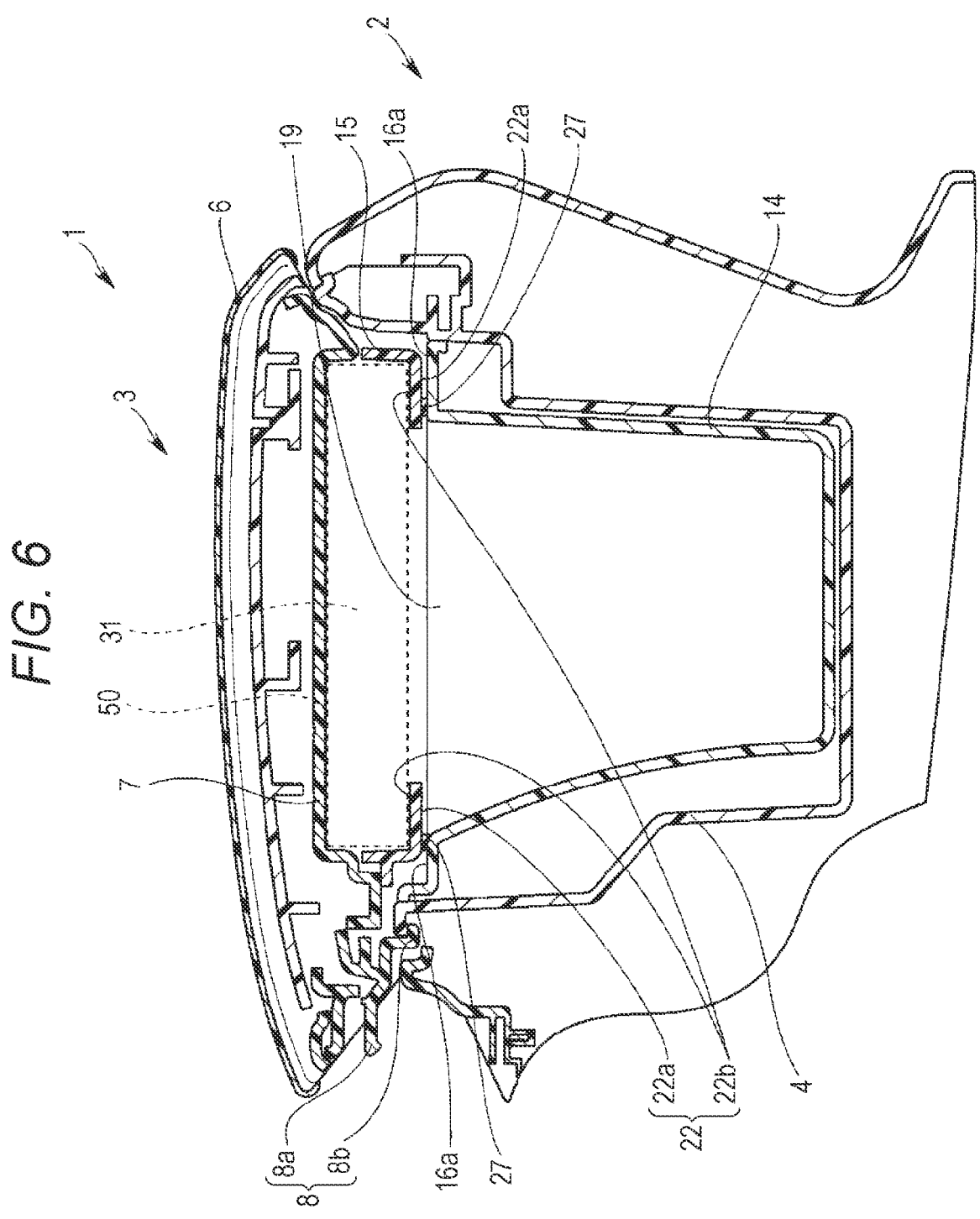
FIG. 6 is a cross-sectional view taken along line VI-VI in a state where the lid body of FIG. 3 is closed.

As illustrated in FIGS. 5 and 6, when the flat plate portion 22 closes the opening 19, the seal member 27 bonded to the first surface 22a in this manner can elastically abut on the surface of the first outward flange 16a. Due to the abutment of the seal member 27, the flat plate portion 22 can seal the outer peripheral side of the opening 19.

The side wall portion 24 protrudes annularly from an edge of a second surface 22b which is a surface opposite to the first surface 22a in the flat plate portion 22.

A pair of attachment portions 25 protrudes from a rear of the side wall portion 24. A distance between the pair of attachment portions 25 is set to be equal to the distance between the pair of support parts 32 provided on the lid body inner 7 and the distance between the pair of support parts 18 provided on the auxiliary box body 14. An arc-shaped locking groove (not illustrated) is formed at the protruding end of each attachment portion 25.

The pair of attachment portions 25 configured as described above can be selectively attached to the pair of support parts 32 or the pair of support parts 18. That is, as illustrated in FIGS. 2 and 3, in a state where the second surface 22b side of the flat plate portion 22 faces the lid body 3 (lid body inner 7), the pair of attachment portions 25 can be attached to the pair of support parts 32. Alternatively, as illustrated in FIGS. 7 and 8, in a state where the second surface 22b side of the flat plate portion 22 faces the auxiliary box body 14, the pair of attachment portions 25 can be attached to the pair of support parts 18.

Such attachment is achieved by locking the locking groove to the shaft 32b or the shaft 18b. This locking is performed by pushing the shaft 32b or the shaft 18b into the locking groove while elastically deforming the locking groove. Therefore, the opening of the locking groove is set to be smaller than diameters of the shaft 32b and the shaft 18b.

The outward flange 23 extends outward from a middle position in a height direction of the side wall portion 24. The planar view shape of the outward flange 23 substantially coincides with a planar view shape of the second outward flange 16b of the auxiliary box body 14. The outward flange 23 can abut on a surface of the lid body inner 7 around the recess 7a and the second outward flange 16b.

The outward flange 23 has a pair of fixing portions 26 at a front portion. Each fixing portion 26 protrudes from a second surface (that is, a surface on the same side as the second surface 22b of the flat plate portion 22) of the outward flange 23. A distance between the pair of fixing portions 26 is set to be equal to a distance between the pair of slits 33 provided in the lid body inner 7 and a distance between the pair of second fixing portions 17b provided in the auxiliary box body 14. Each fixing portion 26 has a projection having a substantially round shape at a distal end. The projection of each fixing portion 26 can be inserted into each of the slits 33 by pushing. The inserted fixing portion 26 is held by the slit 33. Alternatively, in a state where the second surface 22b side faces the auxiliary box body 14, the projection of each fixing portion 26 can be accommodated at a position not in contact with the pair of second fixing portions 17b having a U-shaped groove shape.

Next, operations of the auxiliary storage box 13 configured as described above will be described.

First, an operation when the auxiliary storage box 13 (the auxiliary box body 14 and the auxiliary lid body 15) is used in a state of being stored inside the console box 1 will be described.

When the auxiliary box body 14 is stored in the box inner 4, the fixing portions 17a and 17b of the auxiliary box body 14 are fitted into the positioning recesses 5a and 5b of the box inner 4.

These fitting positions uniquely determine the accommodation position of the auxiliary box body 14 with respect to the box inner 4. Therefore, the auxiliary box body 14 can be accurately positioned with respect to the box body 2, and can be easily stored.

On the other hand, the auxiliary lid body 15 can be detachably attached to the support parts 32 of the lid body inner 7 via the attachment portion 25. Further, the auxiliary lid body 15 can swing about the shafts 32b of the support parts 32 in a state of being attached to the lid body inner 7. Furthermore, the fixing portion 26 of the auxiliary lid body 15 can be detachably fixed to the slits 33.

The auxiliary lid body 15 fixed to the lid body 3 as described above can swing integrally with the lid body 3.

Furthermore, the auxiliary lid body 15 fixed to the lid body 3 forms a first tissue storage portion 31 in an internal space with the recess 7a of the lid body inner 7 as illustrated in FIGS. 5 and 6.

For example, a box storing tissues (hereinafter referred to as a box tissue 50) can be stored in the first tissue storage portion 31.

For example, in a state where the auxiliary lid body 15 is opened with respect to the lid body 3, the box tissue 50 can be stored in the first tissue storage portion 31.

For example, the box tissue 50 can be attached to an upper side of the second surface 22b in a state where an opening surface of the tissue takeout slot of the box tissue 50 faces the hole 30. By housing the box tissue 50 in this manner, when the lid body 3 opens the opening 19, the tissue can be easily taken out from the first surface 22a side of the hole 30.

In addition, the auxiliary lid body 15 can be easily opened and closed with respect to the lid body 3 around the shaft 32b. Therefore, the box tissue 50 stored in the first tissue storage portion 31 can be easily replaced.

Furthermore, by swinging the auxiliary lid body 15 integrally with the lid body 3, a user or the like can easily access the hole 30 and the opening 19 by one opening/closing operation of the lid body 3.

Thus, for example, when the auxiliary box body 14 is used as a trash box, it is possible to access the tissue takeout slot and the trash box by one opening/closing operation.

The box tissue 50 and the trash box stored in this manner are disposed at positions close to each other. Thus, a used tissue can be easily stored in the trash box.

With the auxiliary box body 14 and the auxiliary lid body 15 configured as described above, the auxiliary storage box 13 can improve convenience.

Further, the seal member 27 provided on the first surface 22*a* of the auxiliary lid body 15 elastically abuts on the surface of the first outward flange 16*a* when the auxiliary lid body 15 closes the opening 19 integrally with the lid body 3. Due to the abutment of the seal member 27, the auxiliary lid body 15 can seal the outer peripheral side of the opening 19.

Therefore, for example, when the auxiliary box body 14 is used as a trash box, it is possible to prevent trash from being scattered from the auxiliary storage box 13, and to achieve high functionality in the vehicle interior from the viewpoint of hygiene.

Next, with reference to FIGS. 4, 7, and 8, an operation when the auxiliary storage box 13 (the auxiliary box body 14 and the auxiliary lid body 15) is taken out of the console box 1 and used outdoors or the like will be described.

The lower end of the auxiliary box body 14 has a flat surface. Therefore, for example, even when used outdoors, the auxiliary box body 14 can stand by itself.

When used outdoors, the auxiliary lid body 15 can be attached to the auxiliary box body 14 in a state of being detached from the lid body inner 7. For example, the auxiliary lid body 15 can be attached in a state where the second surface 22*b* faces the opening 19 of the auxiliary box body 14.

The auxiliary lid body 15 attached in this manner is swingably held with respect to the shafts 18*b* of the auxiliary box body 14 via the attachment portion 25. The outward flange 23 of the auxiliary lid body 15 abuts on the upper surface of the second outward flange 16*b* when the auxiliary lid body 15 closes the opening 19 by swinging. When the auxiliary lid body 15 closes the opening 19 of the auxiliary box body 14 in this manner, the space formed between the second surface 22*b* of the auxiliary lid body 15 and the opening 19 of the auxiliary box body 14 can be used as the second tissue storage portion 34 (see FIG. 7).

That is, for example, the box tissue 50 can be stored in the second tissue storage portion 34. For example, the box tissue 50 can be stored in the second tissue storage portion 34 in a state where the auxiliary lid body 15 opens the opening 19. The box tissue 50 is preferably disposed in a state where the surface of the tissue takeout slot of the box tissue 50 faces the hole 30.

The box tissue 50 stored in this manner can be held in the opening 19 of the auxiliary box body 14 by the edge of the bottom surface of the box tissue 50 abutting on the first outward flange 16*a*. In the box tissue 50 stored in this manner, the tissue can be easily taken out from the first surface 22*a* with respect to the hole 30.

Further, when the auxiliary box body 14 is used as a trash box, the box tissue 50 can be stored in the upper part of the auxiliary box body 14. In the auxiliary storage box 13 configured as described above, since the box tissue 50 can be carried in an integrally stored state even outdoors, convenience can be further improved.

According to such an embodiment, the auxiliary storage box 13 is an auxiliary storage box 13 that is stored inside the console box 1 including the box body 2 and the lid body 3 and is detachable from the console box 1, and includes the auxiliary box body 14 that is detachable and stored inside the box body 2, the auxiliary lid body 15 that is detachably held on a back surface side of the lid body 3 in such a manner that the first surface 22*a* faces the auxiliary box body 14, the auxiliary lid body 15 closing the opening 19 of the auxiliary box body 14 when the lid body 3 closes the box body 2, the outward flange 16 in the opening 19 in an upper portion of the auxiliary box body 14, and the seal member 27 that is provided on the first surface 22*a* of the auxiliary lid body 15 and elastically contacts the outward flange 16 when the auxiliary lid body 15 closes the opening 19 to seal the opening 19. With these configurations, the auxiliary storage box can achieve high functionality even when used as a trash box.

Note that, in the present embodiment, an example in which the auxiliary lid body 15 is used as a tissue storage portion has been described, but the auxiliary lid body may be used as a storage portion of an article or the like by closing the tissue takeout hole 30.

Further, in the present embodiment, an example of application to the console box has been described, but it may be applied to other storage units such as a glove box.

The disclosure described in the above embodiments is not limited to these embodiments, and various modifications can be made in the implementation stage without departing from the gist of the disclosure. Furthermore, the above-described embodiments include inventions at various stages, and various inventions can be extracted by appropriately combining disclosed constituent elements.

Further, for example, when the problem to be solved in the disclosure can be solved and the effect of the invention can be obtained even if some constituent elements are deleted from all the constituent elements described in the embodiments, the configuration from which the constituent elements are deleted can be extracted as an invention.

The invention claimed is:

1. An auxiliary storage box that is stored inside a storage box comprising a box body and a lid body and is detachable from the storage box, the auxiliary storage box comprising:
   an auxiliary box body that is detachable and stored inside the box body;
   an auxiliary lid body that is detachably held on a back surface side of the lid body via support parts provided at a rear of the lid body, the support parts configured to swingably support the auxiliary lid body, in such a manner that a first surface faces the auxiliary box body, the auxiliary lid body being configured to swing integrally with the lid body to open and close the opening of the auxiliary box body,
   wherein the lid body comprises slits provided on a front portion of the lid body on a back surface of the lid body facing the box body, and the auxiliary lid body comprises fixing portions configured to be detachably fixed to the slits; and
   a lid receiving portion disposed in the opening in an upper portion of the auxiliary box body,
   wherein the first surface of the auxiliary lid body is configured to, when the auxiliary lid body closes the opening, elastically contact the lid receiving portion to seal the opening.

2. The auxiliary storage box according to claim 1, wherein the first surface of the auxiliary lid body is configured to elastically contact the lid receiving portion via a seal member to seal the opening.

3. The auxiliary storage box according to claim 2, wherein the auxiliary lid body has a second surface opposite to the first surface,
   the auxiliary box body comprises a support part configured to swingably support the auxiliary lid body in a state where a side of the second surface faces the opening, and the auxiliary lid body is configured to form a second tissue storage portion between the auxiliary lid body and the auxiliary box body when the auxiliary lid body is swung to close the opening.

4. The auxiliary storage box according to claim 1, wherein the auxiliary lid body comprises a flat plate portion and a side wall portion protruding from a periphery of the flat plate portion to a second surface opposite to the first surface, and the auxiliary lid body forms a first tissue storage portion between the auxiliary lid body and the lid body.

5. The auxiliary storage box according to claim 4, wherein the auxiliary lid body forming the first tissue storage portion between the auxiliary lid body and the lid body swings integrally with the lid body.

6. The auxiliary storage box according to claim 1, wherein the auxiliary lid body has a second surface opposite to the first surface, the auxiliary box body comprises a support part configured to swingably support the auxiliary lid body in a state where a side of the second surface faces the opening, and the auxiliary lid body is configured to form a second tissue storage portion between the auxiliary lid body and the auxiliary box body when the auxiliary lid body is swung to close the opening.

7. The auxiliary storage box according to claim 1, wherein the auxiliary lid body is configured to be detached from the lid body and attached to the auxiliary box body when the auxiliary storage box is taken out from the storage box, and the opening is openable and closable by the auxiliary lid body when the auxiliary lid body is attached to the auxiliary box body.

8. The auxiliary storage box according to claim 7, wherein the auxiliary box body comprises a pair of support parts provided at a rear of the auxiliary box body, each support part of the auxiliary box body having a pair of projecting parts and a shaft supported between the pair of projecting parts, and wherein the auxiliary lid body comprises a pair of attachment portions protruding from a rear of the auxiliary lid body, each attachment portion having an arc-shaped locking groove at a protruding end configured to selectively and detachably lock to the shaft of a corresponding one of the support parts on the lid body or the shaft of a corresponding one of the support parts on the auxiliary box body.

9. The auxiliary storage box according to claim 7, wherein the auxiliary lid body includes an outward flange, and the outward flange abuts against a second outward flange of the auxiliary box body when the auxiliary lid body closes the opening of the auxiliary box body.

10. The auxiliary storage box according to claim 1, wherein the auxiliary lid body has a second surface opposite to the first surface, and the lid receiving portion comprises a first outward flange configured to be contacted by the first surface of the auxiliary lid body when the lid body closes the box body, and a second outward flange disposed on an upper portion of an outside of the first outward flange, the second surface being configured to contact the second outward flange when the auxiliary lid body closes the auxiliary box body in a state where a side of the second surface faces the opening.

11. The auxiliary storage box according to claim 1, wherein each of the support parts comprises a pair of projecting parts and a shaft supported between the pair of projecting parts.

12. The auxiliary storage box according to claim 1, wherein the auxiliary lid body comprises a pair of attachment portions protruding from a rear of the auxiliary lid body, each attachment portion having an arc-shaped locking groove at a protruding end configured to detachably lock to a shaft of a corresponding one of the support parts on the lid body.

13. The auxiliary storage box according to claim 1, wherein the auxiliary lid body is configured to swing about shafts of the support parts in a state of being attached to the lid body.

* * * * *